3,174,935
ALKYLBENZENE SULFONATE SLURRY
Edwin J. Eccles, Jr., and Richard T. Haynes, Kirkwood, and Leo J. Weaver and Lloyd E. Weeks, Creve Coeur, Mo., assignors to Monsanto Company, a corporation of Delaware
No Drawing. Filed June 20, 1961, Ser. No. 118,268
8 Claims. (Cl. 252—161)

This invention relates to alkylbenzene sulfonate slurries. More specifically, the invention relates to alkylaryl sulfonic acid compositions useful in the manufacture of detergents, which compositions can be neutralized and made into highly concentrated slurries having relatively low viscosities and improved color characteristics.

One difficulty encountered in using higher (i.e., $C_{10}$–$C_{18}$ alkyl chain length) alkylbenzene sulfonates in detergent slurries is that binary mixtures of such sulfonates and water are inherently extremely viscous, and, as a result, are practically impossible to handle in conventional pumping equipment. In order to reduce the viscosity of such mixtures, a small proportion of one or more lower molecular weight aromatic sulfonates (which are sometimes called "viscosity modifying agents"), such as, for example, benzene sulfonate, toluene sulfonate, xylene sulfonate, $C_2$ to $C_5$ alkylbenzene sulfonate, and the like, are blended into the slurry containing the higher alkylbenzene sulfonate and water.

Another difficulty associated with the use of alkylbenzene sulfonates in detergents is that almost all of the alkylbenzenes which are presently commercially available contain a small amount of as-yet-unidentified materials which become intensely colored (usually dark brown or black) when they are sulfonated. Such darkly colored materials contribute substantially and undesirably to the color of detergent products which are made from alkylbenzenes containing them unless the color-making materials are removed from the alkylbenzenes before they are converted into sulfonic acids via sulfonation.

It is known that "acid-washing" the raw higher alkylbenzenes makes possible an improvement in the color of detergent products made therefrom. However, when one attempts to utilize the "acid-washing" techniques heretofore known to remove such color-making materials from a blend of one of the higher alkylbenzenes plus a few weight percent of one of the lower molecular weight aromatic compounds (which is to be converted subsequently into one of the "viscosity modifying agents" described heretofore), it has been found that the fraction of the blend comprising the lower molecular weight aromatic compound is so extremely soluble in the resulting "spent" sulfuric acid that the use of such an "acid-washing" technique is prohibitively expensive. For example, when a blend containing 92 weight percent of dodecylbenzene and 8 weight percent of cumene was "acid-washed" with 10 weight percent of 98% sulfuric acid, more than half of the cumene which was initially present in the blend was "dissolved" into the "spent" sulfuric acid, and was thus lost from the detergent process when the "spent" sulfuric acid layer was withdrawn. Similarly, heavy losses occur when lower molecular weight aromatic compounds other than cumene are utilized in this manner. Consequently, there existed heretofore a need for a new process for preparing a low viscosity, highly concentrated alkylaryl sulfonate slurry with satisfactory color characteristics.

It is a primary object of this invention to provide a process whereby the color of a concentrated anionic slurry which contains a minor proportion of a lower molecular weight aromatic sulfonate can be improved, and yet by which method only a minimum of the lower molecular weight aromatic compounds used in the process is lost from the process in the "spent" sulfuric acid.

It is another primary object of this invention to provide a method for producing an anionic slurry containing as a major component a higher alkylbenzene sulfonate, and as a minor component a lower molecular weight aromatic sulfonate, said slurry having a relatively higher concentration of the said higher alkylbenzene sulfonate, a relatively lower viscosity, and an improved color, as compared with conventional concentrated anionic slurries.

It is still another object of this invention to produce a highly concentrated anionic slurry containing as a major component a higher alkylbenzene sulfonate, and as a viscosity modifying agent, a cumene sulfonate, said slurry being extremely concentrated, having an excellent color, and having an unexpectedly low viscosity.

It has now been discovered that "acid-washed" lower alkylbenzene sulfonates are apparently substantially less soluble in "spent" sulfuric acid in the absence of higher alkylbenzenes than they are in the presence of higher alkylbenzenes, and that the objects of this invention can be accomplished, primarily, by "acid-washing" the higher alkylbenzenes and the lower aromatic compounds separately (rather than as a blend, according to the example above). The final slurry (having an excellent color) can then be made by first blending together the "acid-washed" materials, sulfonating the resulting blend, and finally neutralizing the resulting sulfonic acid mixture with an appropriate base and diluting to the desired concentration with water.

The concentrated anionic slurries with which this invention is concerned are those that contain between about 30 and about 70 weight percent of a water-soluble higher alkylbenzene sulfonate, between about 70 and about 30 weight percent of water (or a mixture of water and a lower molecular weight alcohol such as ethyl, methyl, and isopropyl alcohol), between about 0.5 and about 15 weight percent and preferably between about 2 and about 10 weight percent of a lower molecular weight aromatic sulfonate, and usually a small amount of an inorganic sulfate salt. The higher alkylbenzene sulfonates are those benzene sulfonates which are conventionally efficient water-soluble organic surface active agents which are produced via the sulfonation and neutralization of higher alkylbenzenes having the structure:

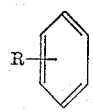

wherein R is a saturated aliphatic hydrocarbyl radical containing between 8 and 20 carbon atoms, but is preferably a saturated aliphatic hydrocarbyl radical containing between 10 and 16 carbon atoms per radical. Processes for the preparation and characterization of these higher alkylbenzenes are well known in the art.

The lower molecular weight aromatic sulfonates referred to above are those which are soluble in water and are produced via the sulfonation and neutralization of lower molecular weight aromatic compounds having the structure:

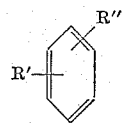

wherein R' is either H or an aliphatic hydrocarbyl radical having between 1 and 6 carbon atoms, and, preferably, having between 2 and 4 carbon atoms per radical; and R" is either hydrogen or an aliphatic hydrocarbyl radical containing either 1 or 2 carbon atoms. The molecular weight of the lower molecular weight aromatic sulfonates within the scope of the present invention fall within the range of from about 180 to about 270, and preferably within the range of from about 190 to about 230. The sulfonates which are within the scope of this invention are those having a cation which is either an alkali metal cation such as, for example, sodium, potassium and lithium; an ammonium cation; or an alkaline earth metal cation such as calcium, magnesium, etc., but preferably, those having an alkali metal cation selected from the group consisting of sodium and potassium.

The amount of inorganic sulfate which can be present in the anionic slurries of this invention varies considerably, depending upon many factors well known to those in the art, such as the method by which the organic blend is sulfonated, the amount of process time allotted for the "spent" sulfuric acid to settle from the organic layer, the viscosity of the sulfonated organic materials, and whether or not the anionic sulfonated materials are treated still further (after sulfonation) to remove the residual sulfuric acid from the organic sulfonic acids or to remove the inorganic sulfate salts from the neutralized organic sulfonates. Generally, functionally satisfactory anionic slurries can contain up to about 10 weight percent of the inorganic sulfate. However, for optimum results with respect to viscosity reduction in the final, concentrated, anionic slurry, it has now been found that the inorganic sulfate content must be maintained below about 1.5 weight percent, and preferably below about 0.75 weight percent, based on the total weight of the anionic slurry. Since slurries containing low levels of inorganic sulfate are most conveniently prepared by utilizing sulfuric anhydride ($SO_3$) as the sulfonating agent, one of the preferred embodiments of this invention involves sulfonation with $SO_3$ of the blended, separately "acid-washed" higher alkylbenzenes and lower molecular weight aromatic compounds (described heretofore). (The actual manipulative requirements for sulfonating alkylaromatic compounds with $SO_3$ or its complexes are well-known in the art and need not be detailed here.) Although the use of sulfuric anhydride is a preferred method for sulfonating these aromatic materials the invention can be practiced utilizing any of the procedures conventionally used to sulfonate alkylaromatic and/or aromatic compounds, and, therefore, is not limited to the use of $SO_3$.

It is a desirable objective of those who "acid-wash" alkylbenzenes to preferentially sulfonate during the "acid-washing" step only those materials in the alkylbenzene which might contribute to the undesirably dark color in the detergent products made therefrom. In order to accomplish this objective, the concentration and the amount of sulfuric acid which is utilized to "acid-wash" the higher and lower molecular weight alkylaromatic compounds, respectively, have been found to have an important bearing upon the quality of the detergent products which result from practicing this invention. Generally, in order to effectively remove the color-making materials from the higher alkylbenzenes, the sulfuric "wash" acid must contain from about 92% to about 110% $H_2SO_4$, and will preferably contain between about 96% and about 105% $H_2SO_4$. The concentration of sulfuric "wash" acid which is used to separately "acid-wash" the lower molecular weight aromatic compounds contemplated by the inventors can be somewhat lower than that which is used to effectively "clean-up" the higher alkylbenzenes. Accordingly, any concentration of sulfuric acid within the range of from about 90% to about 110% $H_2SO_4$ can be used for this purpose. It has been found that the most effective and economical sulfuric "wash" acids (for "acid-washing" the lower molecular weight aromatic compounds encompassed hereby) contain between about 94% and about 105% sulfuric acid. Although a substantial improvement in the color (whiteness) of the anionic slurries (produced according to this invention) can result from treating the respective higher and lower molecular weight alkylaromatic raw materials with as little as 3 weight percent of the sulfuric "wash" acid (based on the weight of the particular raw organic aromatic compound being "acid-washed"), for optimum color improvement, at least about 6 weight percent of the sulfuric "wash" acid should be used. Generally no additional color improvement in the final slurry can be noted when more than about 15 weight percent of the "wash" acid is used. But with increasing amounts of sulfuric "wash" acid, increasing amounts of the desirable, non-color-making fraction of the aromatic materials are dissolved into the acid layer and are thus effectively lost from the process when the "spent" acid layer is discarded. For this reason, a compromise must ordinarily be made by the sulfonic acid manufacturer between the desirability of improving the color of detergents made from his sulfonic acids by using relatively larger quantities of sulfuric "wash" acid, and the undesirability of increasing processing costs which will result from the concurrent increased losses of the desirable alkylaromatic compounds from the process. Taking all of these factors into consideration, it has been found that the preferred total amount of sulfuric "wash" acid which is utilized to "acid-wash" each batch of "raw" organic material is between about 5 and about 11 weight percent based on the organic alkkylaromatic materials beiing "acid-washed."

The sulfuric "wash" acid can be used to clean up the respective higher and lower molecular weight alkylaromatic compounds in accordance with this invention in any manner whereby the "wash" acid is brought into sufficient contact with the organic materials for it to react with the undesirable color-making materials contained therein. Generally, it is sufficient to moderately agitate the appropriate mixture of sulfuric "wash" acid and the respective raw alkylaromatic or aromatic compound which is to be "acid-washed" in a mixing tank for from at least about 2 minutes and preferably for from about 5 minutes to about 30 minutes. When extremely efficient agitation (as for example in a homogenizer,) is applied in order to more effectively bring the materials into contact with one another, even shorter contact times can be utilized.

The manipulative procedure which is used to "acid-wash" the alkylaromatic compounds contemplated herein can be varied considerably without detracting substantially from the major benefits of this invention. For example, the "acid-washing" can be accomplished either as a single step or as a multiplicity of steps or stages depending upon the peculiar requirements of the one who is practicing the invention. While from the standpoint of process time it is advantageous to "acid-wash" in a single contact step; from the standpoint of color improvement in the final anionic slurry, it is preferred that the "acid-washing" be accomplished in at least two separate stages. For example, if only a portion of the sulfuric "wash" acid (i.e., half) is first contacted with the organic layer, subsequently allowed to settle, and then withdrawn, a large proportion of the potential color-making materials in the organic layer is removed along with the "spent" acid. Then, if the remainder of the "wash-acid" is agitated with the resulting, partially "acid-washed" organic layer, subsequently allowed to settle, and then withdrawn, almost all of the remaining color-making materials are removed from the organic layer with the "spent" acid. If a similar procedure for "acid-washing" is utilized, except that it is accomplished in three separate stages rather than by the two stage procedure illustrated above, a still further improvement in product color can be noted. For a given quantity of "wash" acid however (other factors being equal), no substantial improvement in product color can be noted if the number of stages in the "acid-washing" process is increased to above about three.

After the respective alkylaromatic compounds have been sufficiently contacted with the "wash" acid, the agitation is stopped, and the "spent" sulfuric "wash" acid allowed to settle out of the organic layer. This separation can be performed via a conventional gravity separation technique, or by suitable mechanical means, for example, by means of a centrifuge, etc. The amount of process time allotted for this settlement of "spent" acid will vary according to both the desire of the manufacturer and such other process variables (such as for example, the viscosity of the organic continuous phase, the type and severity of agitation during the "washing" step, the temperature of the system, the means utilized for the separation, and the like), the consideration of which factors are well within the abilities of those skilled in the art, and need not be detailed here. Generally, the "acid-washing" as herein contemplated is performed at a temperature within the range of from about 20° C. to about 40° C., and preferably at a temperature within the range of from about 25° C. to about 35° C. While temperatures higher than about 40° C. can be employed, the use of such higher temperatures sometimes results in a poorer color in the final detergent slurry product.

After the higher alkylbenzene and the lower molecular weight aromatic "raw" materials have been separately "acid-washed" and separated from the "spent" sulfuric acid according to the above processes, they can be blended together in approximately the proportions at which their respective sulfonates will appear in the final anionic slurry. For example, if the final slurry is to contain 55% of sodium dodecylbenzene sulfonate and 5% of sodium xylene sulfonate, a blend of 11 parts by weight of "acid-washed" dodecylbenzene plus 1 part by weight of "acid-washed" xylene is sulfonated. The sulfonation can be performed in any manner that can ordinarily be employed to sulfonate alkylaromatic compounds. Many such procedures are well-known in the detergent art. However, as it was stated heretofore, the use of sulfuric anhydride (blended with dry air to prevent charring) is preferred, because its use makes possible the production of slurries containing at most very small amounts of inorganic sulfate, which slurries have, in turn, unexpectedly low viscosities.

The invention will now be illustrated by the following specific examples, in which all parts are by weight unless otherwise specified.

EXAMPLE I

Into a conventional glass-lined mixing vessel is poured 5000 parts of dodecylbenzene having the following chemical and physical characteristics (a typical conventional higher alkylbenzene):

Characteristic: Data
  Formula _____ $C_{12}H_{25}C_6H_5$, approx.
  Average molecular weight ___ 246.
  Appearance _____ Water-white liquid.
  Boiling range (1st drop to
    95% at 760 mm.) _____ 526–556° C.
  Specific gravity (60° F.) ____ 0.870.
  Solubility in water _____ Nil.

Then 500 parts of 100% sulfuric acid (equivalent to 10 weight percent of the dodecylbenzene) is added. The mixture is thoroughly agitated by means of a turbine type mixing blade for 15 minutes, and then allowed to stand without being stirred for 30 minutes. The lower ("spent" acid) layer is then withdrawn and discarded. After the addition of 250 parts of fresh 100% sulfuric acid, the resulting mixture is again agitated for 15 minutes and allowed to stand without agitation for 45 minutes. Again the "spent" acid layer is withdrawn and discarded. A total of about 1 weight percent of the original dodecylbenzene is removed with the two fractions of "spent" acid.

A part of the resulting "acid-washed" dodecylbenzene is then sulfonated according to the following procedure:

Sulfonation

Into a conventional sulfuric anhydride sulfonator (through which a dry air stream is being circulated) are charged 246 parts of the above-described "acid-washed" dodecylbenzene. Agitation of the alkylbenzene is then begun (and is continued throughout the following sulfonation steps). The circulation of dry air through the alkylbenzene is also continued throughout this sulfonation procedure. Over a period of 95 minutes, vaporized sulfuric anhydride is blended with the dry air at a ratio of about 10:1 (of dry air to $SO_3$ gas), and passed into the alkylbenzene at a rate which results in the consumption of 84 parts of $SO_3$ within a 95 minute interval. The temperature of the alkylbenzene is maintained below about 55° C. during this reaction period. Then the addition of $SO_3$ is discontinued, and after 10 minutes of additional stirring, 3 parts of ethylene glycol is added (to "quench" any unreacted $SO_3$ remaining in the reaction mass and to react with any anhydrides which may be present). After an additional 10-minute agitation, the dodecylbenzene sulfonic acid is drained from the reaction vessel (sulfonator).

The color of a three weight percent solution of the resulting sulfonic acid in distilled water (measured by means of a Fisher Electrophotometer through 5 cm. of the solution, using a 425 m$\mu$ filter) is 55% T (transmittance) as compared with that of distilled water. By this color test, percent T's greater than about 50 are considered acceptable. Therefore, it is expected that upon being neutralized, this sulfonic acid should yield a detergent product (sulfonate) having an acceptably good color.

Neutralization

Into a conventional, water-jacketed mixing vessel containing 30 parts of sodium hydroxide and 140 parts of water is poured slowly 250 parts of the dodecylbenzene sulfonic acid described above. Agitation is applied to the mixture in the vessel throughout this procedure. The temperature is maintained below about 60° C. during said neutralization. The resulting sodium dodecylbenzene sulfonate slurry has a very good color (yellowness index =0.145). Yellowness index is the ratio of Percent red (650 m$\mu$) transmittance
—percent blue (425 m$\mu$) transmittance Percent green (525 m$\mu$) transmittance and is a true "tristimulus" color value. However, the viscosity of the slurry is so high that it cannot be measured using a modified Stormer viscosimeter. Because of its high viscosity, this slurry cannot be used in conventional pumping and handling equipment, even at relatively high temperatures. The "solids" content of this slurry is 62%.

Some of the advantages of the present invention will be illustrated in Example II, below.

EXAMPLE II

Acid-washing the viscosity modifier

To 1000 parts of technical toluene being stirred in a conventioinal mixing vessel, which is provided with a bottom outlet, is added 100 parts of 100% sulfuric acid. The resulting mixture is intermixed for 20 minutes, and then allowed to stand, without stirring, for 30 minutes. The lower "spent" acid layer (containing only 0.4% of the total amount of toluene treated) is then withdrawn.

It will be noted that when the toluene is "acid-washed" separately (according to the process of this invention), the "spent" acid contains only about 4%, by weight of toluene dissolved therein (based on the weight of the "spent" acids). By comparison, when the heretofore-described technique of "acid-washing" a blend of 90% dodecylbenzene, for example, with 10% toluene, the "spent" acid layer contains about 30% by weight, of toluene (presumably as toluene sulfonic acid). Although the reason is not known for this apparent dependence of the solubility of the lower molecular weight aromatic compounds upon the particular "acid-washing" process employed, the substantial benefits which result from practicing the invention (in the amount of said lower molecular weight aromatic compounds which is saved for the process, rather than lost into the "spent" acid) can readily be appreciated.

*Sulfonation*

A blend of 920 parts of the dodecylbenzene, which has been "acid-washed" according to Example I, and 80 parts of toluene, which has been "acid-washed" according to the aforesaid procedure, is sulfonated in substantially the same manner as that utilized in the sulfonation step of Example I, utilizing 105% of the amount of $SO_3$ which is theoretically required, based on the average molecular weight of the organic blend. The blue (425m$\mu$) transmittance of a 3% solution of the resulting sulfonic acid in water is 65%, which is considered excellent.

*Neutralization*

Into a water-jacketed mixing vessel containing 89 parts of NaOH and 530 parts of water is added, slowly, 630 parts of the sulfonic acid prepared above. The temperature of the reaction mass is maintained below about 60° C. during this neutralization. The resulting anionic slurry has an excellent color (yellowness index = 0.135). Its apparent viscosity is 1000 cps. at 27° C. Therefore, although the slurry contains 54.5% of "solids" (non-volatile at 110° C.), it can be used in conventional pumping and handling equipment at this temperature.

*Use of Cumene*

Until now the use of cumene (isoprophylbenzene) as a viscosity modifying agent for slurries which largely contain the higher alkylbenzene sulfonates has been prohibitive for at least one reason. The reason is that cumene apparently contains relatively more of the undesirazle color-making materials described heretofore than do most of the other lower molecular weight aromatic compounds contemplated herein, because its use (without an "acid-washing" treatment) in the preparation of detergents causes a very dark color to develop in the detergent products. This is true whether the cumene has been produced synthetically or is a natural product.

The practice of this invention makes it practicable for the first time to utilize cumene sulfonates as viscosity modifying agents, because it makes it possible to considerably reduce the amount of cumene that would otherwise be lost from the process into the "spent" sulfuric "wash" acid when it is desired to apply "acid-washing" techniques to detergent preparation processes. Example III illustrates the substantial benefits that can result from practicing this invention when cumene sulfonates are utilized as viscosity modifying agents.

EXAMPLE III

*Use of cumene-acid-washing*

To 500 parts of technical cumene which are being stirred in a conventional stainless steel mixing vessel, are added 50 parts of 98% sulfuric acid. The resulting mixture is agitated for 20 minutes. Then it is allowed to settle (without agitation) for 40 minutes. The lower "spent" acid layer is then withdrawn. It contains 5% by weight, of cumene, presumably as cumene sulfonic acid, including practically all of the color-making materials that had been present in the cumene. Thus a total of only 0.5% of the cumene is "lost" from the process into the "spent" acid. The remaining "acid-washed" cumene is clear and water-white. It will be noted that had the same amount of cumene (500 parts) been "acid-washed" as a part of a blend with the higher alkylbenzene, at least about 35% of the cumene would have been "lost" from the process into the "spent" sulfuric "wash" acid layer.

*Sulfonation*

A blend of 2450 parts of the dodecylbenzene ("acid-washed" according to Example I) and 210 parts of the "acid-washed" cumene ("acid-washed" according to the above process) is sulfonated in substantially the same manner as that utilized in the sulfonation step of Example I, utilizing 105% of the theoretically required amount of sulfuric anhydride. The blue (425 m$\mu$) transmittance of a 3% aqueous solution of the resulting sulfonic acid is 68%, which is considered to be an excellent color. The sulfonic acid is "quenched" for 20 minutes with 35 parts of ethylene glycol.

*Neutralization*

Into a water-jacketed mixing vessel containing 320 parts of NaOH and 1520 parts of water is added slowly (while the basic solution is being stirred) 2570 parts of the sulfonic acid prepared above. The final pH of about 7 to 8 is arrived at by using additional small increments of NaOH or sulfonic acid as needed. The temperature of the neutralization mass is maintained at below 80° C. The resulting anionic slurry has an excellent color (yellowness index=0.090). Its apparent viscosity is only 830 c.p.s. at 27° C. Its $Na_2SO_4$ content is 0.75%. Note that even at 61% solids, this slurry can be readily pumped and handled in conventional equipment.

Another very surprising aspect of this invention can be noted with respect to the use of cumene as a viscosity modifying agent. For some as-yet-unexplained reason, when cumene sulfonate is utilized according to the practice of this invention as a viscosity modifying agent for anionic slurries containing more than about 55 weight percent of "solids" (non-volatile at 110° C., atmospheric pressure), the anionic slurries which result are significantly less viscous than are anionic slurries containing the same amount of cumene sulfonate, which cumene sulfonate has been manufactured separately from the higher alkylbenzene sulfonate and is intermixed therewith. Thus, sulfonation of the blend of a higher alkylbenzene with one of the lower molecular weight aromatic compounds contemplated herein (such as cumene) is one of the preferred embodiments of this invention. For example, at room temperature an anionic slurry containing 60% "solids" (6% sodium cumene sulfonate, 53% sodium dodecylbenzene sulfonate, and 0.75% $Na_2SO_4$), prepared according to the procedure described in Example III, above, has an apparent viscosity of 650 cps. at 27° C. An apparently "identical" anionic slurry containing 60% "solids" (6% sodium cumene sulfonate, 53% sodium dodecylbenzene sulfonate, and 0.75% $Na_2SO_4$), but which was prepared by first making a slurry without the cumene sulfonate (as in Example I, above), and thereafter intermixing sodium cumene sulfonate therewith in the right amount, has a much higher apparent viscosity: 850 cps. at 27° C. Equivalent results can be noted when the corresponding potassium or ammonium salts are used.

As a result of the several advantages that result from utilizing this invention during the manufacture of anionic slurries containing cumene sulfonate as a viscosity modifying agent (i.e., improvement in slurry color, substantial savings of cumene, and relatively lower viscosity of the slurry), it is now commercially practical to produce a slurry containing a higher "solids" content (which still has an acceptably low viscosity) than was heretofore believed possible. For example, an anionic slurry containing as much as 65% of "solids" can be prepared utilizing only 8 weight percent of sodium cumene sulfonate, which slurry is pumpable in conventional equipment at 30° C. But when sodium benzene sulfonate, sodium xylene sulfonate, sodium toluene sulfonate, or sodium ethylbenzene sulfonate is used at the same concentration, and in an otherwise identical slurry, the highest "solids" slurry which can be made which will be conventionally pumpable is about 55% "solids" at the same temperature. Since in the detergent field it is usually desirable to make slurries which are as high in concentration, or "solids" as practicable, the benefit of practicing this preferred embodiment of the present invention can readily be appreciated. Table I illustrates the relative effect of some of the viscosity modifying agents contemplated herein upon anionic slurries containing, as a major component, sodium dodecylbenzene sulfonate. Similar effects can also be noted in concentrated slurries containing other of the higher alkylbenzene sulfonates.

*Table I.—Effect of viscosity modifying agents on viscosity dodecylbenzene sulfonate slurry* [1]

| Viscosity modifier | Apparent viscosity [2] (Cps.) |
|---|---|
| None | Too high to measure. |
| Sodium cumene sulfonate | 500–800. |
| Sodium xylene sulfonate | 850–1000. |
| Sodium toluene sulfonate | 850–1000. |
| Sodium benzene sulfonate | 900–1200. |
| Sodium ethylbenzene sulfonate | 800–1100. |

[1] The slurries contain 50 weight percent of sodium dodecylbenzene sulfonate, 8 weight percent of the sodium salt of the lower molecular weight sulfonate (viscosity modifying agent), and 0.6 weight percent of sodium sulfate.
[2] By the modified Stormer viscosimeter at 27° C. The variations in viscosity noted above represent those which can be expected, depending upon the source of the dodecylbenzene.

It should be noted that this particular preferred embodiment of the present invention depends not only upon the manner in which the "raw" alkylaromatic materials have been "acid-washed," but also upon the relative absence of inorganic sulfate salts from the slurry as well. For example, since the viscosity of the anionic slurry can be greatly increased by the presence of more than a small amount of any soluble inorganic sulfate salt, it is preferred that the level of said inorganic sulfate salt be maintained in the slurry below about 1.5 weight percent. In addition, it appears that, while some benefits with respect to the viscosity of the anionic slurries can be noted when as little as 1 weight percent of one of the lower molecular weight alkylaromatic compounds (viscosity modifying agents) is present in the slurry, it is preferred that for optimum results, at least about 2 weight percent of these lower molecular weight materials be present. However, because these viscosity modifying agents generally do not contribute importantly to the major function of the anionic slurries (detergency), as a practical matter, the lower molecular weight aromatic materials will invariably be present in the anionic slurries contemplated herein as a minor component, preferably making up less than about 10 weight percent of the slurry.

What is claimed is:

1. A process for producing an aqueous anionic slurry having an improved color, which process comprises the steps of mixing together a separately sulfuric acid-washed higher alkylbenzene and a separately sulfuric acid-washed lower molecular weight aromatic compound, and then sulfonating the resulting mixture; said higher alkylbenzene having the structure

wherein R is a saturated aliphatic hydrocarbyl radical containing between 8 and 20 carbon atoms, and said lower molecular weight aromatic compound having the structure

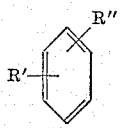

wherein R' is selected from the group consisting of hydrogen and aliphatic hydrocarbyl radicals containing from 1 to 6 carbon atoms, and R" is selected from the group consisting of hydrogen and aliphatic hydrocarbyl radicals containing from 1 to 2 carbon atoms.

2. A process for producing an aqueous anionic slurry having an improved color, which process comprises the steps of mixing together from about 30 to about 70 parts by weight of a sulfuric acid-washed higher alkylbenzene having the structure

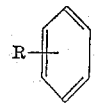

wherein R is a saturated aliphatic hydrocarbyl radical containing from 8 to 20 carbon atoms; and from about 0.5 to about 15 parts by weight of a sulfuric acid-washed lower molecular weight aromatic compound having the structure

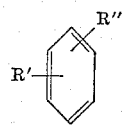

wherein R' is selected from the group consisting of hydrogen and aliphatic hydrocarbyl radicals containing from 1 to 6 carbon atoms, and R" is selected from the group consisting of hydrogen and aliphatic hydrocarbyl radicals containing from 1 to 2 carbon atoms; sulfonating the resulting mixture and neutralizing the resulting sulfonic acids with a base selected from the group consisting of alkali metal hydroxides, ammonium hydroxide, and alkaline earth metal hydroxides.

3. A process as in claim 2 wherein said base is an alkali metal hydroxide.

4. A process as in claim 3 wherein said base is sodium hydroxide.

5. A process for producing an aqueous anionic slurry having an improved color, which process comprises the steps of separately contacting a higher alkylbenzene having the structure

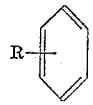

wherein R is a saturated aliphatic hydrocarbyl radical containing from 8 to 20 carbon atoms; with from about 3 to about 15 weight percent, based on the weight of said higher alkylbenzene, of sulfuric acid having a concentration of $H_2SO_4$ between about 92% and about 110% for at least 2 minutes, and thereafter recovering the resulting acid-washed higher alkylbenzene; separately contacting a lower molecular weight aromatic compound having the structure

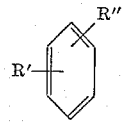

wherein R' is selected from the group consisting of hydrogen and aliphatic hydrocarbyl radicals containing from 1 to 6 carbon atoms, and R" is selected from the group consisting of hydrogen and aliphatic hydrocarbyl radicals containing from 1 to 2 carbon atoms; with from about 3 to about 15 weight percent, based on the weight of said lower molecular weight aromatic compound, of sulfuric acid having a concentration of $H_2SO_4$ between about 90% and about 110% for at least 2 minutes, and thereafter recovering the resulting acid-washed lower molecular weight aromatic compound; blending together from about 30 to about 70 parts by weight of said acid-washed higher alkylbenzene with from about 2 to about 10 parts by weight of said acid-washed lower molecular weight aromatic compound; sulfonating the resulting blend with sulfuric anhydride; neutralizing the resulting sulfonic acids with a base intermixed with water, said base being selected from the group consisting of alkali metal hydroxides, ammonium hydroxide and alkaline earth metal hydroxides.

6. A process as in claim 5 wherein said lower molecular weight compound is cumene.

7. A process as in claim 6 wherein said base is sodium hydroxide.

8. A concentrated anionic slurry having an excellent color and an unexpectedly low viscosity, said slurry containing between about 70 and about 30 weight percent of water, between about 30 and about 70 weight percent of a higher alkylbenzene sulfonate, between about 2 and about 10 weight percent of a lower molecular weight aromatic sulfonate having a molecular weight within the range of from about 190 to about 230, and between 0 and about 1.5 weight percent of an inorganic sulfate salt, said slurry having been prepared by a process which comprises sulfonating with sulfuric anhydride a blend of a separately sulfuric acid-washed higher alkylbenzene having the structure

wherein R is a saturated aliphatic hydrocarbyl radical containing from 8 to 20 carbon atoms; and a separately sulfuric acid-washed lower molecular weight aromatic compound having the structure

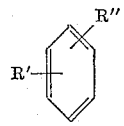

wherein R' is selected from the group consisting of hydrogen and aliphatic hydrocarbyl radicals containing from 1 to 6 carbon atoms, and R'' is selected from the group consisting of hydrogen and aliphatic hydrocarbyl radicals containing from 1 to 2 carbon atoms; which blend contains said sulfuric acid-washed higher alkylbenzene and said sulfuric acid-washed lower molecular weight aromatic compound in approximately the relative proportions at which their respective sulfonates appear in said anionic slurry.

References Cited in the file of this patent

UNITED STATES PATENTS

| | | |
|---|---|---|
| 2,682,509 | Ross | June 29, 1954 |
| 2,805,249 | Gilbert et al. | Sept. 3, 1957 |
| 2,806,875 | Geiser | Sept. 17, 1957 |
| 2,813,832 | Nigh | Nov. 19, 1957 |